March 6, 1945. S. S. ROBERTS Re. 22,614

FOOTWEAR SAFETY DEVICE

Original Filed April 1, 1943 3 Sheets-Sheet 1

INVENTOR:
SAMUEL S. ROBERTS,
BY: John E. Jackson
HIS ATTORNEY.

March 6, 1945. S. S. ROBERTS Re. 22,614

FOOTWEAR SAFETY DEVICE

Original Filed April 1, 1943 3 Sheets-Sheet 2

INVENTOR:
SAMUEL S. ROBERTS.
BY: John E. Jackson
HIS ATTORNEY.

March 6, 1945. S. S. ROBERTS Re. 22,614
FOOTWEAR SAFETY DEVICE
Original Filed April 1, 1943 3 Sheets-Sheet 3
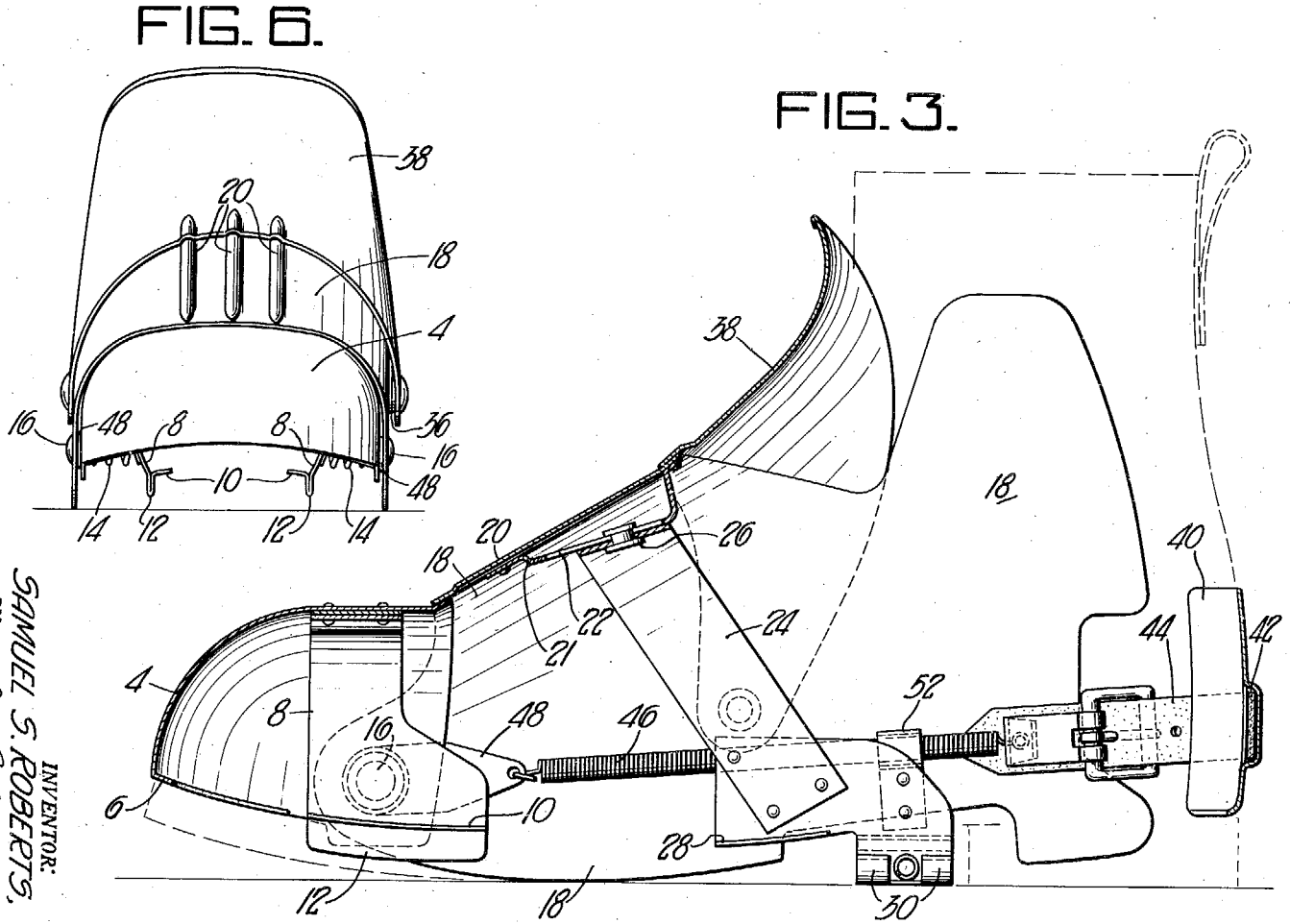
INVENTOR:
SAMUEL S. ROBERTS,
BY: John E. Jackson
HIS ATTORNEY.

Reissued Mar. 6, 1945

Re. 22,614

UNITED STATES PATENT OFFICE 22,614

FOOTWEAR SAFETY DEVICE

Samuel S. Roberts, Pittsburgh, Pa.

Original No. 2,339,193, dated January 11, 1944, Serial No. 481,471, April 1, 1943. Application for reissue December 30, 1944, Serial No. 570,565

13 Claims. (Cl. 36—72)

This invention relates to footwear safety devices and particularly to such devices used in conjunction with safety shoes.

To obtain the full cooperation of the worker in using footwear safety devices, it is necessary that the device be flexible so that the worker can perform any operation, such as stooping or climbing, without discomfort or interference. To fully protect the wearer of the device, the device must be made so as to protect the wearer regardless of the position of his foot. The guard must protect the toes, vamp, instep, metatarsal joint, the ankle and tibia leg bone of the worker.

It is an object of this invention to provide a flexible footwear safety device capable of withstanding the shock of impacts regardless of the position of the foot.

Another object is to provide such a device which may be applied to any standard type or size of safety shoe.

These and other objects will be more apparent after referring to the following description and attached drawings, in which:

Fig. 3 is a section on line III—III of Fig. 2;

Fig. 4 is a section on line IV—IV of Fig. 1;

Fig. 6 is a front view of the guard.

Figure 1:
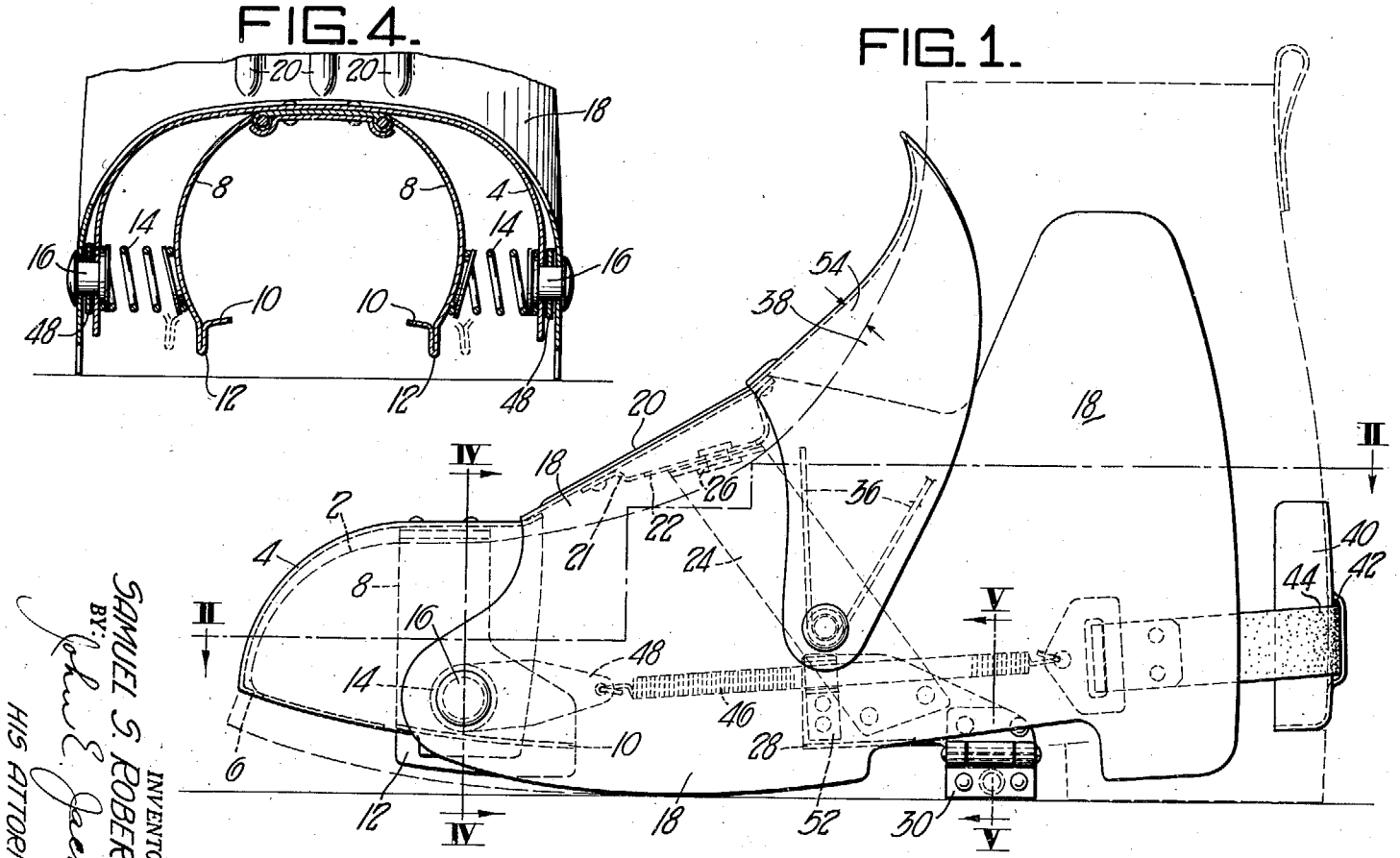
Fig. 1 is a side elevation of the guard.
Figure 2:
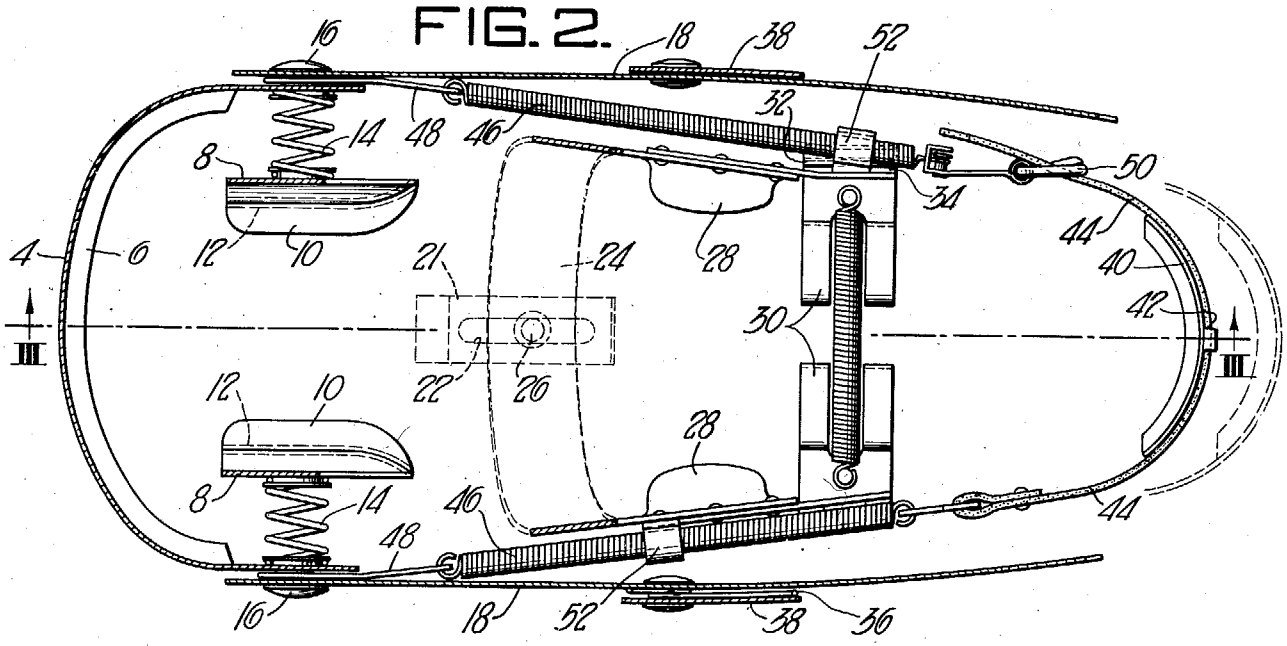
Fig. 2 is a section on line II—II of Fig. 1.
Figure 5:
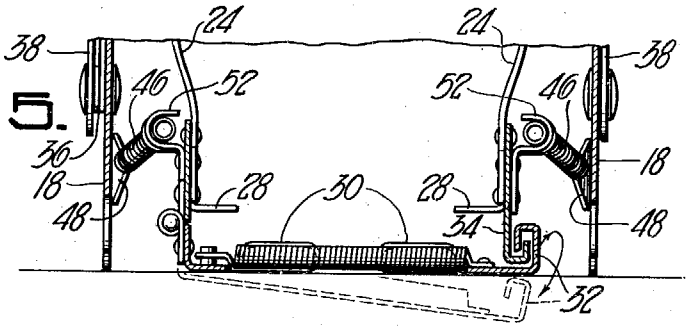
Fig. 5 is a section on line V—V of Fig. 1.

Referring more particularly to the drawings, the reference numeral 2 indicates a safety shoe to which the safety guard of the present invention is to be applied. The various parts of the guard may be die stamped from any suitable material such as wood, steel, plastic, and the like. The guard consists of a toe cap 4 having a bottom ledge 6 for resting on the welt of the shoe. The toe cap protects the toe area and provides a forward anchorage for the guard assembly. Two arch swing clips 8 are riveted to the toe cap and have a bottom ledge 10 for resting on the welt of the shoe. Below the ledge are the finger grips 12 which facilitate the application and subsequent removal of the guard to the shoe. The swing clips 8 automatically adjust themselves and grip the shoe under influence of the compression springs 14 to fit any size shoe between Nos. 6 and 12.

Pivotally mounted on the toe cap 4, by means of pivot bolts 16, is the main cover 18 which may be provided with reinforcing ribs 20. The cover 18 extends upwardly and rearwardly as shown in order to protect the ankle. On the under side of the main cover 18 is a loop strap 21 having a slot 22 therein. A rear spring steel arch 24 is adjustably connected to the strap 21 by means of a pin 26. The arch 24 has a bottom inner ledge 28 on either side thereof which rests on the shank welt of the shoe. Hinged to the bottom of one leg of the steel arch 24 is an under slung spring loaded link 30 having a notched fastener 32 in one end thereof for attachment to the hasp 34 connected to the other leg of the spring steel arch. The spring loaded link 30 extends crosswise directly in front of the heel of the shoe to provide a supplementary anchorage to insure that the ledges of the arch will remain fixed and exert a constant gripping action on the shoe's shank. The slot 22 permits the rear arch to be shifted lengthwise to accommodate different shoe sizes and to suit the foot movements. It is desirable that the heel of the main cover 18 should remain in close proximity to the floor regardless of the size of the shoe to which it is attached, thus affording maximum protection to the foot. To accomplish this result, the strap 21 is arranged so that it makes a substantially smaller angle with the horizontal than does that portion of the main cover 18 to which the strap 21 is attached. The inherent resiliency of the spring steel rear arch provides a cushion to partly absorb shock impacts regardless of the position of the foot and thus effects a partial reduction in the kinetic energy or initial force of the blow. In the event of rear arch failure, the entire perimeter of the bottom of the main cover 18 contacts the floor surface, thus providing extra insurance against injury to the foot. Hinged to the main cover 18 with a spring retractor 36 is an auxiliary cover 38 which extends upwardly to provide additional protection for the tibia leg bone.

A curved back plate 40 is positioned on the shoe's counter and is provided with a strap groove 42 through which a tension strap 44 passes. The tension strap is connected to the toe cap 4 by means of helical expansion spring 46. The forward end of each spring is connected to an end clip 48 which is pivotally mounted on the bolt 16. One end of the tension strap is riveted to the rear end of one spring and the other is connected by means of a buckle 50 to the rear end of the other spring. To secure firmer and more rigid connection of the safety guard to the shoe the expansion springs 46 pass through guide loops 52 riveted to the rear arch 24. As shown in Fig. 1 there is clearance 54 between the guard and the front of the shoe.

To apply the guard to the shoe the toe arch clips 8 are spread by means of the finger grips 12 and the guard is then slid horizontally along the toe cap's welt. The main cover 18 and the spring rear arch 24 are depressed over the instep until the lower edge of the arch 24 seats on the shank welt. The link 30 is then positioned to contact the front of the heel crosswise and the fastener 32 is hooked over the hasp 34. The springs 46 are pulled up by means of strap 44 and buckle 50 to secure the guard in position with the ledges resting on the sole or welt of the shoe. It will be seen that the main cover 18 has been cut away to enable buckle 50 to rotate on its vertical axis, thus facilitating the ease with which the strap may be fastened thereto.

To remove the guard the tension strap is released and the fastener 32 disconnected from the hasp 34 to enable the under slung link to be swung back. The rear arch 24 is then lifted above the instep and the guard pushed forward until the toe arch clips 8 clear the toe of the shoe.

While one embodiment of the invention has been shown and described, it is understood that other modifications and adaptations may be made without departing from the scope of the attached claims.

I claim:

1. A footwear safety guard comprising a toe cap having a bottom ledge for resting on the welt of said footwear, a guard cover pivotally mounted on said toe cap, said cover extending to the bottom of said footwear, an arch mounted on said cover, said arch having a ledge thereon for resting on the shank welt of said footwear, means connecting the lower ends of said arch, means for holding said guard against longitudinal movement on said footwear and means for holding said guard against transverse movement on said footwear.

2. A footwear safety guard comprising a toe cap having a bottom ledge for resting on the welt of said footwear, a guard cover pivotally mounted on said toe cap, said cover extending to the bottom of said footwear, an arch mounted on said cover, said arch having a ledge thereon for resting on the shank welt of said footwear, means connecting the lower ends of said arch, a curved back plate, means for connecting said back plate to said toe cap and means for holding said guard against transverse movement on said footwear.

3. A footwear safety guard comprising a toe cap having a bottom ledge for resting on the welt of said footwear, a guard cover pivotally mounted on said toe cap, said cover extending to the bottom of said footwear, an arch mounted on said cover, said arch having a ledge thereon for resting on the shank welt of said footwear, means connecting the lower ends of said arch, an auxiliary cover pivotally connected to said guard cover and extending upwardly therefrom, means for holding said guard against longitudinal movement on said footwear and means for holding said guard against transverse movement on said footwear.

4. A footwear safety guard comprising a toe cap having a bottom ledge for resting on the welt of said footwear, spring pressed swing clips connected to said toe cap, each of said clips having a ledge thereon for resting on the welt of said footwear, a guard cover pivotally mounted on said toe cap, said cover extending to the bottom of said footwear, an arch mounted on said cover, said arch having a ledge thereon for resting on the shank welt, means connecting the lower ends of said arch, and means for holding said guard against longitudinal movement on said footwear.

5. A footwear safety guard comprising a toe cap having a bottom ledge for resting on the welt of said footwear, spring pressed swing clips connected to said toe cap, each of said clips having a ledge thereon for resting on the welt of said footwear, a guard cover pivotally mounted on said toe cap, said cover extending to the bottom of said footwear, an arch mounted on said cover, said arch having a ledge thereon for resting on the shank welt, means connecting the lower ends of said arch, a curved back plate, and means for connecting said back plate to said toe cap.

6. A footwear safety guard comprising a toe cap having a bottom ledge for resting on the welt of said footwear, spring pressed swing clips connected to said toe cap, each of said clips having a ledge thereon for resting on the welt of said footwear, a guard cover pivotally mounted on said toe cap, said cover extending to the bottom of said footwear, an arch mounted on said cover, said arch having a ledge thereon for resting on the shank welt, means connecting the lower ends of said arch, an auxiliary cover pivotally connected to said guard cover and extending upwardly therefrom, a curved back plate, and means for connecting said back plate to said toe cap.

7. A footwear safety guard comprising a toe cap having a bottom ledge for resting on the welt of said footwear, spring pressed swing clips connected to said toe cap, each of said clips having a ledge thereon for resting on the welt of said footwear, a guard cover pivotally mounted on said toe cap, said guard cover extending to the bottom of said footwear, a spring steel arch adjustably mounted on said cover, said arch having a ledge thereon for resting on the shank welt of said footwear, means connecting the lower ends of said arch, an auxiliary cover pivotally connected to said guard cover and extending upwardly therefrom, a curved back plate, and means connecting said back plate with said toe cap.

8. A footwear safety guard comprising a toe cap having a bottom ledge for resting on the welt of said footwear, spring pressed swing clips pivotally connected to said toe cap, each of said clips having a ledge thereon for resting on the welt of said footwear, a guard cover mounted on said toe cap, said guard cover extending to the bottom of said footwear, a spring steel arch adjustably mounted on said cover, said arch having a ledge thereon for resting on the shank welt of said footwear, means connecting the lower ends of said arch, an auxiliary cover pivotally connected to said guard cover and extending upwardly therefrom, a curved back plate, a strap passing through a loop in said back plate, and a spring connection between each end of said strap and said toe cap, said spring connection passing through loops in said arch.

9. A footwear safety guard comprising a toe cap having a bottom ledge for resting on the welt of said footwear, spring pressed swing clips connected to said toe cap, each of said clips having a ledge thereon for resting on the welt of said footwear, a guard cover pivotally mounted on said toe cap, said guard cover extending to the bottom of said footwear, a spring steel arch adjustably mounted on said cover, said arch having a ledge thereon for resting on the shank welt, a spring loaded link connecting the lower ends of said arch, an auxiliary cover pivotally connected to said guard cover and extending upwardly therefrom, a curved back plate, and means connecting said back plate with said toe cap.

10. A footwear safety guard comprising a toe cap having a bottom ledge for resting on the welt of said footwear, spring pressed swing clips connected to said toe cap, each of said clips having a ledge thereon for resting on the welt of said footwear, a guard cover pivotally mounted on said toe cap, said guard cover extending to the bottom of said footwear, a spring steel arch adjustably mounted on said cover, said arch having a ledge thereon for resting on the shank welt, a spring loaded link connecting the lower ends of said arch, an auxiliary cover pivotally connected to said guard cover and extending upwardly therefrom, a curved back plate, a strap passing through a loop in said back plate, and a spring connection between each end of said strap and said toe cap, said spring connection passing through loops in said arch.

11. A footwear safety guard comprising a toe cap, clips connected to said toe cap, each of said clips having a ledge thereon for resting on the welt of said footwear, a guard cover pivotally mounted on said toe cap, an arch mounted on said cover, said arch having a ledge thereon for resting on the shank welt, means urging the lower ends of said arch toward each other, and means for holding said guard against longitudinal movement on said footwear.

12. A footwear safety guard comprising a toe cap, spring pressed clips connected to said toe cap, each of said clips having a ledge thereon for resting on the welt of said footwear, a guard cover pivotally mounted on said toe cap, said cover extending substantially to the bottom of said footwear, an arch mounted on said cover, said arch having a ledge thereon for resting on the shank welt, means urging the lower ends of said arch toward each other, and means for holding said guard against longitudinal movement on said footwear.

13. A footwear safety guard comprising a toe cap, spring pressed clips connected to said toe cap, each of said clips having a ledge thereon for resting on the welt of said footwear, a guard cover pivotally mounted on said toe cap, said cover extending substantially to the bottom of said footwear, an arch mounted on said cover, said arch having a ledge thereon for resting on the shank welt, means urging the lower ends of said arch toward each other, an auxiliary cover pivotally connected to said guard cover and extending upwardly therefrom, and means for holding said guard against longitudinal movement on said footwear.

SAMUEL S. ROBERTS.